United States Patent
Ravindranath et al.

(10) Patent No.: US 10,564,637 B2
(45) Date of Patent: Feb. 18, 2020

(54) WIRELESS E-SIGNOFF SYSTEM

(71) Applicant: HONEYWELL INTERNATIONAL INC., Morris Plains, NJ (US)

(72) Inventors: Balasubramanyam Ravindranath, Karnataka (IN); Sreekumar Thekkuttu Pisharam, Karnataka (IN); David B. Goldstein, Washington, NJ (US); Ranga Udipi, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 152 days.

(21) Appl. No.: 15/726,182

(22) Filed: Oct. 5, 2017

(65) Prior Publication Data

US 2019/0107834 A1 Apr. 11, 2019

(51) Int. Cl.
| | | |
|---|---|---|
| G05D 1/00 | (2006.01) | |
| G06F 21/33 | (2013.01) | |
| H04L 29/06 | (2006.01) | |
| G06Q 10/06 | (2012.01) | |

(52) U.S. Cl.
CPC ........... *G05D 1/0022* (2013.01); *G06F 21/33* (2013.01); *G06Q 10/063114* (2013.01); *H04L 63/0815* (2013.01)

(58) Field of Classification Search
CPC .......... G05D 1/0022; G06Q 10/063114; H04L 63/0815; G06F 21/33
See application file for complete search history.

(56) References Cited

U.S. PATENT DOCUMENTS

| | | |
|---|---|---|
| 6,816,762 B2 | 11/2004 | Hensey et al. |
| 8,981,967 B1 | 3/2015 | Shore et al. |
| 9,070,099 B2 | 6/2015 | Holmes et al. |
| 9,635,497 B2 | 4/2017 | Anderson et al. |
| 10,075,228 B2 * | 9/2018 | Klippert ................. H04W 4/40 |

(Continued)

FOREIGN PATENT DOCUMENTS

WO 2008063238 A2 5/2008

OTHER PUBLICATIONS

Extended EP Search Report for Application No. 18198517.7 dated Nov. 16, 2018.

(Continued)

*Primary Examiner* — Mussa A Shaawat
(74) *Attorney, Agent, or Firm* — Lorenz & Kopf, LLP

(57) ABSTRACT

An electronic signoff system for vehicle departure readiness is provided which may include, but is not limited to, a wireless e-signoff management system, the wireless e-signoff management system configured to generate a workflow for a turnaround of the vehicle, transmit one or more tasks to each of a plurality of personal electronic devices, receive an indication that one of the tasks has been completed when the personal electronic device reads a task completion component associated with the task, update a dashboard corresponding to the workflow after each task is completed, transmit a notification to any subscribing electronic device, the notification including the data from the dashboard, receive, from an electronic device associated with the turnaround coordinator, final signoff notification when the vehicle is ready to depart, and transmit the final signoff notification to the at least one of the subscribing electronic devices.

14 Claims, 2 Drawing Sheets

(56) References Cited

U.S. PATENT DOCUMENTS

| | | | |
|---|---|---|---|
| 10,320,908 B2* | 6/2019 | O'Sullivan | G06Q 50/30 |
| 10,373,404 B2* | 8/2019 | Curtis | G08G 5/0052 |
| 2003/0069648 A1 | 4/2003 | Douglas et al. | |
| 2003/0093187 A1* | 5/2003 | Walker | B64C 13/20 |
| | | | 701/1 |
| 2005/0090969 A1 | 4/2005 | Siok et al. | |
| 2009/0288091 A1* | 11/2009 | Papadakos | G06F 9/5011 |
| | | | 718/104 |
| 2010/0161157 A1* | 6/2010 | Guilley | G05B 23/0272 |
| | | | 701/3 |
| 2010/0292869 A1* | 11/2010 | Riley | G06Q 10/06 |
| | | | 701/3 |
| 2010/0312420 A1* | 12/2010 | Sham | G06Q 10/00 |
| | | | 701/3 |
| 2011/0040595 A1* | 2/2011 | Chou | G06Q 10/06 |
| | | | 705/7.42 |
| 2011/0160937 A1* | 6/2011 | Caillaud | G06Q 10/06 |
| | | | 701/3 |
| 2013/0158991 A1* | 6/2013 | Dong | G08G 5/0013 |
| | | | 704/235 |
| 2013/0265425 A1* | 10/2013 | Smailus | G01C 23/00 |
| | | | 348/148 |
| 2014/0278638 A1 | 9/2014 | Kreuzkamp et al. | |
| 2014/0330605 A1 | 11/2014 | Connolly et al. | |
| 2015/0026696 A1 | 1/2015 | Gillam | |
| 2015/0081141 A1* | 3/2015 | Campbell | B64F 5/23 |
| | | | 701/3 |
| 2015/0120097 A1* | 4/2015 | Hathaway | B64C 19/00 |
| | | | 701/14 |
| 2015/0193735 A1 | 7/2015 | Lavrov et al. | |
| 2015/0195356 A1* | 7/2015 | Kim | H04W 4/18 |
| | | | 709/217 |
| 2015/0248422 A1 | 9/2015 | Zha et al. | |
| 2016/0247101 A1 | 8/2016 | Agrawal et al. | |
| 2017/0011638 A1 | 1/2017 | Agrawal et al. | |
| 2017/0021925 A1 | 1/2017 | Weller et al. | |
| 2017/0236428 A1* | 8/2017 | High | B64C 39/024 |
| | | | 701/120 |
| 2017/0366962 A1* | 12/2017 | Kim | H04W 8/18 |
| 2018/0188723 A1* | 7/2018 | Lee | G05D 1/0038 |
| 2018/0281948 A1* | 10/2018 | Tao | G05B 19/048 |
| 2019/0034814 A1* | 1/2019 | Amer | G06N 20/00 |

OTHER PUBLICATIONS

Wikipedia: "Object hyperlinking", Internet Article, Sep. 7, 2017 (Sep. 7, 2017),XP055521302, Retrieved from the Internet: URL: https:/ /en.wikipedia.org/w/index. php?title=Object_hyperlinking &oldid=799327194 [retrieved on Nov. 6, 2018].

Wikipedia: "Mobile device", Internet Article, Sep. 30, 2017, XP055521304, Retrieved from the Internet: URL:https //en.wikipedia.org/w/Index.php?title=Mobile_device&oldid=803138080 [retrieved on Nov. 6, 2018].

Langer, Josef, et al. "Anwendungen and Technik von Near Field Communication (NFC)" Sep. 16, 2010, Springer Berlin Heidelberg, Berlin, Heidelberg, XP055178840, ISBN: 978-3-64-205497-6, Ch 01, Ch 05, Ch 07-09, pp. 230-235.

Sabella, Robert P. NFC for Dummies, 1st Edition, Apr. 11, 2016, XP055435455, ISBN: 978-1-119-18292-4, ToC,Ch02-Ch09, Ch11-Ch17, Ind, p. 120-pp. 121, 135.

* cited by examiner

US 10,564,637 B2

WIRELESS E-SIGNOFF SYSTEM

TECHNICAL FIELD

The present disclosure generally relates to an aircraft, and more particularly relates to systems and methods for determining when an aircraft is ready to depart.

BACKGROUND

After each flight of a commercial aircraft, for example, numerous tasks must be completed before the aircraft is ready to depart for a next flight. Typically support staff utilize hand signals and/or radio communications to coordinate with a red hat coordinator (i.e., the person responsible for signing off that the aircraft is ready to depart) to indicate that a respective task has been completed. However, hand signals can be misread or missed entirely and radio communications may be misheard or missed entirely which can delay the turnaround process.

BRIEF SUMMARY

In one embodiment, for example, an electronic signoff system for vehicle departure readiness is provided. The electronic signoff system may include, but is not limited to, a wireless e-signoff management system comprising a processor and a memory, the wireless e-signoff management system configured to generate a workflow for a turnaround of the vehicle, the workflow comprising a plurality of tasks that are required to be completed before the vehicle can depart, transmit, via a communication system, one or more of the plurality of tasks to each of a plurality of personal electronic devices corresponding to personnel responsible for completing the one or more of the plurality of tasks, receive, from at least one of the plurality of personal electronic devices, an indication that one of the plurality of tasks has been completed when the personal electronic device reads a task completion component associated with the one of the plurality of tasks, update a dashboard corresponding to the workflow after each of the plurality of tasks is completed, transmit a notification to any subscribing electronic device, the notification including the data from the dashboard, receive, from an electronic device associated with the turnaround coordinator, final signoff notification when the vehicle is ready to depart, and transmit the final signoff notification to the at least one of the subscribing electronic devices.

In another embodiment, for example a method for operating an electronic signoff system is provided. The method may include, but is not limited to, receiving, by a wireless e-signoff management system, a task list for a turnaround of a vehicle from a coordination system, generating, by the wireless e-signoff management system, a workflow for the vehicle based upon the received task list, the workflow including an order in which the tasks from the task list may be completed based on available resource, distributing, by the wireless e-signoff management system, at least one task from the task list to each of a plurality of personal electronic devices based upon the generated workflow, receiving, by the wireless e-signoff management system from at least one of the plurality of personal electronic devices, an indication that one of the tasks is a completed task when the at least one of the plurality of personal electronic devices is within communication range of a task completion component, the task completion component being mounted to one a task system, transmitting, by the wireless e-signoff management system, the completed task to the coordination system, receiving, by the wireless e-signoff management system, a final signoff from the coordination system when all of the tasks in the task list are completed tasks, and transmitting, by the wireless e-signoff management system, the final signoff to the vehicle.

In another embodiment, for example, an electronic signoff system for vehicle departure readiness is provided. The electronic signoff system may include, but is not limited to, a plurality of vehicles, each vehicle comprising a plurality of task systems associated with tasks, and a plurality of task completion components, each task completion components mounted on the vehicle proximate to one of the plurality of task systems, and a wireless e-signoff management system comprising a processor and a memory, the wireless e-signoff management system configured to generate a workflow for a turnaround of each of the plurality of vehicles based upon available resources and a least one business rule, the workflow comprising a plurality of tasks that are required to be completed before each of the plurality of vehicles can depart, transmit, via a communication system, one or more of the plurality of tasks to each of a plurality of personal electronic devices corresponding to personnel responsible for completing the one or more of the plurality of tasks, receive, from at least one of the plurality of personal electronic devices, an indication that one of the plurality of tasks has been completed when the personal electronic device reads a corresponding one of the plurality of task completion components associated with the one of the plurality of tasks, update a dashboard corresponding to the workflow for each of the plurality of vehicles after each of the plurality of tasks corresponding to a respective vehicle is completed, transmit a notification to any subscribing electronic device, the notification including the data from the dashboard, receive, from an electronic device associated with the turnaround coordinator, final signoff notification when a respective one of the plurality of vehicles is ready to depart, and transmit the final signoff notification for the respective one of the plurality of vehicles to the at least one of the subscribing electronic devices.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with an embodiment, a system and method for a wireless e-signoff system is provided. The system and method utilize a series of personal electronic devices and task completion components to signal that a task has been completed, and a wireless e-signoff management system to coordinate communication between the various components of the system. When a turn-around coordinator receives the signal that all tasks have been completed, the turn-around coordinator can transmit a final signoff for the aircraft or other vehicle, as discussed in further detail below.

Figure 1:
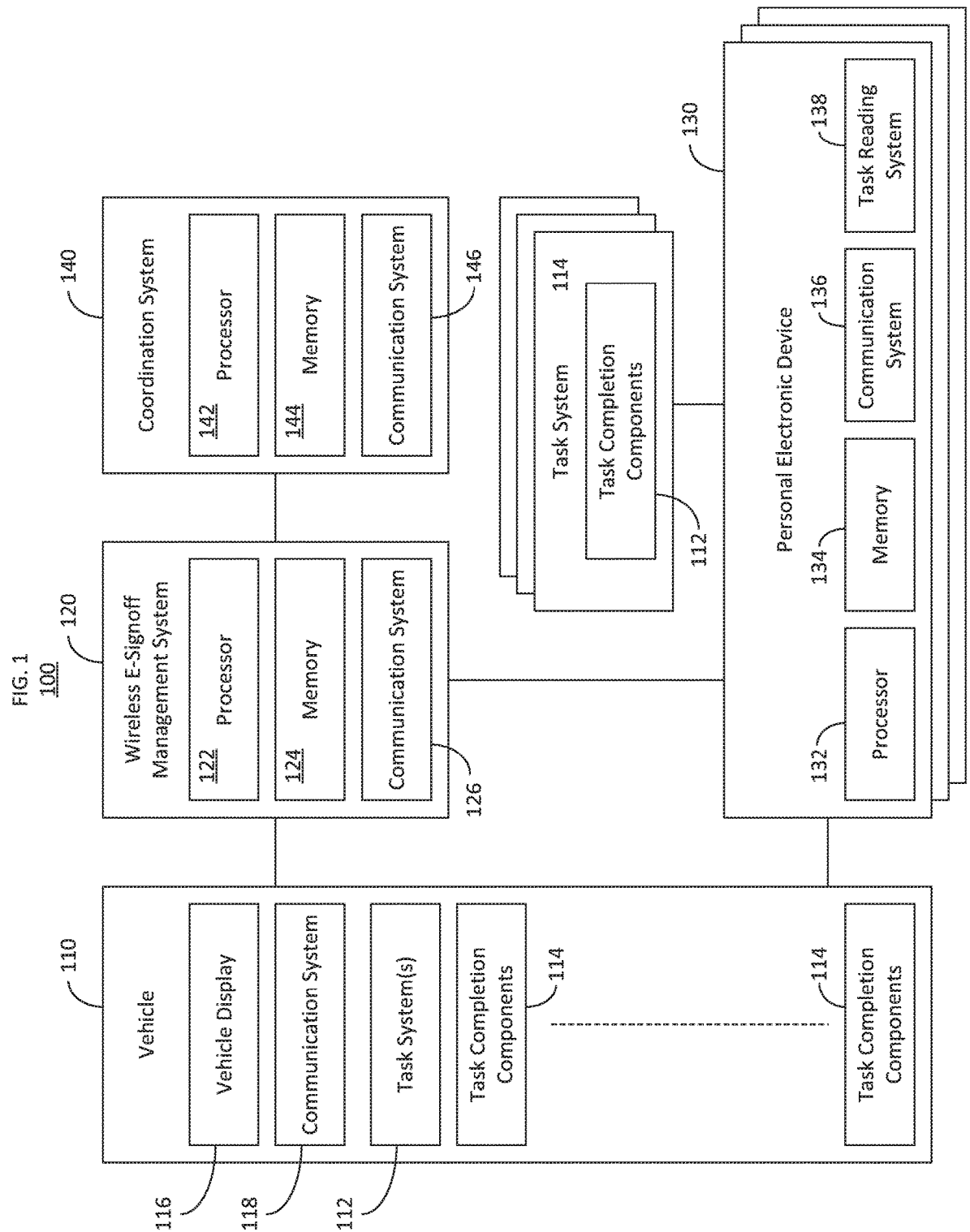
FIG. 1 is a block diagram of wireless e-signoff system, in accordance with an embodiment.

FIG. 1 is a block diagram of wireless e-signoff system 100, in accordance with an embodiment. The wireless e-signoff system 100 may be used to indicate that a vehicle 110 is ready. In one embodiment, for example, the vehicle 110 may be ready, for example, when the vehicle 110 is ready to depart. However, the wireless e-signoff system 100 may be used to indicate that the vehicle 110 is ready for any task, mission or other purpose.

The vehicle 110 may be, for example, an aircraft (e.g., airplane, helicopter, drone or the like), a spacecraft, a watercraft, a landcraft (e.g., a railway train), or any other type of vehicle or combination thereof. When the vehicle 110 is a commercial airplane, for example, the commercial airplane may be deemed ready when all of the aircraft turn-around tasks have been completed such that the vehicle can depart the current airport for a destination airport.

The wireless e-signoff system 100 includes one or more task systems 112. As illustrated in FIG. 1, the task systems 112 may be part of the vehicle 110 or may be separate from the vehicle 110. The task systems 112 can vary depending upon the type of vehicle 110. When the vehicle 110 is an airplane, for example, the task systems 112 may include boarding systems (e.g., vehicle doors, airport gateway doors, the kiosk near the gate, ramps, stairways, passenger transport buses, or the like), cargo systems (e.g., baggage carts, baggage ramps, baggage hull doors, etc.), fuel systems (vehicle refueling gaskets, fuel trucks, etc.), lavatory systems, catering systems, water systems, any other ground handling systems or any location the vehicle 110 or in the airport that are serviced by the ground handling/turnaround staff.

One or more tasks associated with each task system 112 may need to be completed before the vehicle 110 can be deemed ready for the respective departure, task, mission or the like. When the vehicle 110 is a commercial aircraft, for example, typical tasks that may need to be completed before the aircraft can depart include, but are not limited to, one or more of: cargo/baggage unloading from a previous flight, cargo/baggage loading for a next flight, passenger disembarking from a previous flight, passenger boarding for a next flight, crew disembarking from a previous flight, crew boarding for a next flight, catering setup for a next flight, inflight environment setup for a next flight, cabin cleaning, lavatory services, refueling, portable water services, aircraft line maintenance, de-icing services, air start services, aircraft tugging, or the like.

Each task is associated with one or more task completion components 114. As discussed in further detail below, the task completion components 114 are used to track when each task has been completed. In one embodiment, for example, the task completion components 114 may be communication devices such as radio frequency identification (RFID) tags, or the like. In other embodiments, for example, the task completion component may be a barcode, QR code, a serial number, an eInk enabled displayed, an infrared emitter, a beacon emitter, or the like. Any combination of different types of task completion components 114 may be used in the wireless e-signoff system 100. Each task completion component 114 is preferably located on or near a corresponding task system 112 associated with the task. For example, a task completion components 114 associated with a refueling task can be located near a filler cap or other part of the fueling system of the vehicle 110. Accordingly, when the task of refueling the vehicle 110 is complete, the personnel performing the task is proximate to the respective task completion components 114 associated with refueling the vehicle 110, thereby allowing the personnel to quickly and efficiently indicate that the task has been completed. As another example, when boarding doors on an aircraft are closed, a crew member could interact with a task completion component 114 on or near the boarding door to indicate that the task (i.e., closing the boarding door) was complete. Another example is a moving entity (such as a mobile stair case) which may have a task completion component 114 attached thereto to signify that the staircase has undocked from the vehicle 110, thereby implying that the passengers have completed boarding/de-boarding. In one embodiment, for example, multiple task completion components 114 may be mounted in different locations, but may be associated with the same task. Using the fueling example from above, a second task completion component 114 could be mounted on a fuel truck. Accordingly, only when both of the task completion components 114 (i.e., the one of the vehicle 110 and the one on the fuel truck) are used may the task be considered complete, thereby providing a double check that the task was complete.

In one embodiment, for example, the vehicle 110 may further include a vehicle display 116 and a communication system 118. The vehicle display 116 may be a display fixed to the vehicle 110, such as on a dashboard of the vehicle 110, or may be part of an electronic device carried onto the vehicle, such as a cell phone display, a tablet display, a laptop display, a wearable electronic device display, or the like. In another embodiment, both of a fixed vehicle display and one or more portable vehicle displays may be utilized. The communication system 118 may be part of the vehicle 110 itself, or part of a portable electronic device, or a combination thereof. The communication system 118 may utilize one or more communication protocols including, but not limited to, cellular, WIFI, Bluetooth, ZigBee, Satellite, or the like, or any combination thereof to communicate with other components of the wireless e-signoff system 100, as discussed in further detail below.

The wireless e-signoff system 100 further includes a wireless e-signoff management system 120. The wireless e-signoff management system 120 acts as a coordinator and a hub between the various components of the wireless e-signoff system 100, as discussed in further detail below. In the context of a commercial airline, for example, each airline may utilize a separate wireless e-signoff management system 120 at each airport or at one or more centralized locations managing multiple airports.

The wireless e-signoff management system 120 includes a processor 122 and a memory 124. The processor 122 may be a central processing unit (CPU), a physics processing unit (PPU), a graphics processing unit (GPU), a field programmable gate array (FPGA), an application specific integrated circuit (ASIC), a microcontroller, or any other logic unit or combination thereof. The memory 124 may be any combination of volatile and non-volatile memory. In one embodiment, for example, a portion of the memory 124 may be a cloud based memory located remotely from the wireless e-signoff management system 120. The wireless e-signoff management system 120 further includes a communication system 126. The communication system 126 may communicate over one or more communication protocols including, but not limited to, cellular, WIFI, Bluetooth, ZigBee, Satellite or the like. The communication system 126 may be used to communicate with other components of the wireless e-signoff system 100, as discussed in further detail below, as well as any cloud based portion of the memory 124.

The wireless e-signoff system 100 may further include one or more personal electronic devices (PED) 130. The PEDs may be, for example, smart watches, smart glasses, cellular phones, tablet computers, or any other handheld or wearable electronic device or any combination thereof. Each PED 130 includes a processor 132, a memory 134 and a communication system. The processor 132 may be a central processing unit (CPU), a physics processing unit (PPU), a graphics processing unit (GPU), a field programmable gate array (FPGA), an application specific integrated circuit (ASIC), a microcontroller, or any other logic unit or combination thereof. The memory 134 may be any combination of volatile and non-volatile memory. In one embodiment, for example, a portion of the memory 134 may be a cloud based memory located remotely from the PED 130. The communication system 136 may communicate over one or more communication protocols including, but not limited to, near field communication (NFC), cellular, WIFI, Bluetooth, ZigBee, Satellite or the like. The communication system 136 may be used to communicate with other components of the wireless e-signoff system 100, as discussed in further detail below, as well as any cloud based portion of the memory 124.

In one embodiment, for example, the communication system 136 of the PED 130 communicates with the task completion components 114. When a task is completed, the user of the PED 130 can establish communication between the PED 130 and the task completion components 114. When the task completion components 114 is a RFID tag, for example, the communication can be established between the PED 130 and the task completion components 114 merely by bringing the PED within range of the task completion components 114. In another embodiment, for example, a user of a PED 130 may actively establish communication between the PED 130 and a task completion components 114 by, for example, pushing a hard or soft button or other hardware or software based interface on the PED 130. When communication is established between the PED 130 and task completion component 114, the task completion component may transmit data to the PED 130. The data may include, for example, a code associated with the specific vehicle 110 and a specific task.

In another embodiment, for example, the PED 130 may further include a task reading system 138. The task reading system 138 may be, for example, an optical camera, a bar code reader, a quick response (QR) code reader or the like. When a task is completed, the user of the PED 130 can establish communication between the PED 130 and the task completion component 114 by pointing the task reading system 138 at the task completion component 114. In one embodiment, for example, a user of a PED 130 may actively establish communication between the PED 130 and a task completion components 114 by, for example, pushing a hard or soft button or other hardware or software based interface on the PED 130.

In one embodiment, for example, the wireless e-signoff system 100 may further include a coordination system 140. The coordination system 140 may be an electronic system utilized by a person in charge of the preparation of the vehicle 110. In the context of a commercial airline, the person is often referred to as a turn-around coordinator. The coordination system 140 may be, for example, a desktop computer, a laptop computer, a tablet, a cell phone, smart glasses, a smart watch, wearable device or the like.

The coordination system 140 may include a processor 142 and a memory 144. The processor 142 may be a central processing unit (CPU), a physics processing unit (PPU), a graphics processing unit (GPU), a field programmable gate array (FPGA), an application specific integrated circuit (ASIC), a microcontroller, or any other logic unit or combination thereof. The memory 144 may be any combination of volatile and non-volatile memory. In one embodiment, for example, a portion of the memory 144 may be a cloud based memory located remotely from the coordination system 140. The coordination system 140 further includes a communication system 146. The communication system 146 may communicate over one or more communication protocols including, but not limited to, cellular, WIFI, Bluetooth, ZigBee, Satellite or the like. The communication system 146 may be used to communicate with other components of the wireless e-signoff management system 120, as discussed in further detail below, as well as any cloud based portion of the memory 144.

Figure 2:
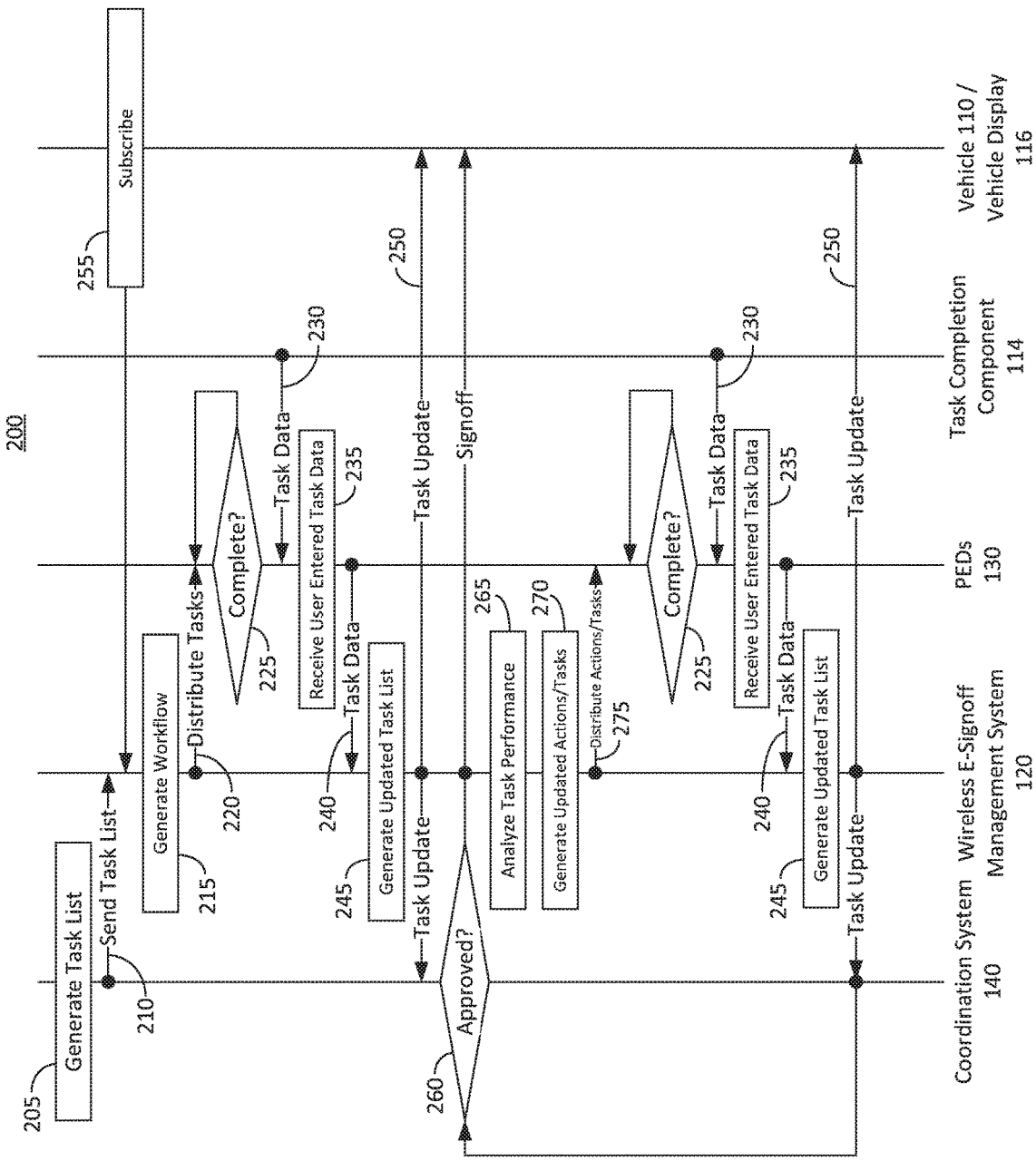
FIG. 2 is a flow diagram illustrating an exemplary method for operating the wireless e-signoff system, in accordance with an embodiment.

FIG. 2 is a flow diagram illustrating an exemplary method 200 for operating the wireless e-signoff system 100, in accordance with an embodiment. While the wireless e-signoff system 100 can be utilized for a wide variety of vehicles and a wide variety of tasks, the method 200 will be described in the context of an aircraft preparing for a turnaround flight for the sake of simplicity.

In one embodiment, for example, the method 200 may begin when a user of the coordination system 140 generates a task list for a turnaround of an aircraft. (Step 205). The task list may be based upon default tasks common to all flights, tasks specific to an upcoming flight and input from the crew of the incoming aircraft. The task list may include tasks, for example, cargo/baggage unloading from a previous flight, cargo/baggage loading for a next flight, passenger disembarking from a previous flight, passenger boarding for a next flight, crew disembarking from a previous flight, crew boarding for a next flight, catering setup for a next flight, inflight environment setup for a next flight, cabin cleaning, lavatory services, refueling, portable water services, aircraft line maintenance, de-icing services, air start services, or the like. The task list may further include task specific requirements, such as the amount of fuel required to be added to the aircraft, specific meal services, entertainment system selections or the like. The coordination system 140 then sends the task list to the wireless e-signoff management system 120. (Step 210). In another embodiment, for example, the wireless e-signoff management system 120 may determine the tasks itself based upon flight data associated with the next flight of the aircraft, as discussed in further detail below.

In one embodiment, for example, the wireless e-signoff management system 120 generates a workflow for the aircraft upon receiving the task list from the coordination system 140 and/or based upon flight data associated with the vehicle 110. (Step 215). The flight data may include, for example, the origin airport, the destination airport, expected passenger counts, local weather, fuel loaded quantity, water loaded quantity, cargo loads that accrue to determine the aircrafts weight, and the like. The processor 122 of the wireless e-signoff management system 120 may determine the tasks for the next flight of the vehicle 110 based upon the flight data. For example, the amount of fuel needed for the flight may be based upon the type of aircraft, the distance to a destination airport and an expected number of passengers. As another example, inflight entertainment for the vehicle 110 may be based upon a direction of travel of the vehicle.

The generated workflow includes which tasks should be completed in which order and assigns one or more personnel to perform the tasks. Certain tasks must be completed in a certain order. For example, regulations require that the aircraft must be refueled after passengers deboard the aircraft and before passengers reboard the aircraft. However, certain other tasks may be completed in parallel with other tasks. For example, cargo/baggage loading and unloading can be conducted at the same time as catering activities. The processor 122 of the wireless e-signoff management system 120 may determine which tasks are available tasks. Available tasks are tasks which may begin to be performed based upon the current status of the generated workflow. The personnel assigned to the task may be chosen based upon, in part, the availability of the personnel and the qualifications of the personnel. The availability and qualifications of the personnel may be stored, for example, in the memory 124.

The wireless e-signoff management system 120 may assign tasks to personnel based upon the available resources at the airport, as well as the requirements for each vehicle which is simultaneously going through a turnaround process or which is scheduled to begin a turnaround during or after the target vehicle turnaround. The wireless e-signoff management system 120 may, for example, consider a set of rules for assigning personnel. A business rule may define which flights have priority for personnel assignments. For example, an airline may, when encountering limited resources, assign resources to short flights (for example, flights which are less than an hour) before intercontinental flights which, due to the length of the flight, may be better able to make up for ground delays while in flight than shorter flights.

The wireless e-signoff management system 120 then transmits the available tasks to PED's 130 associated with personnel assigned to each available task. (Step 220). In one embodiment, for example, each PED 130 may be assigned to specific personnel, a specific task system 112 or a combination thereof. For security purposes, each PED 130 may require airport personnel to login to the PED 130 with secure credentials to access the PED 130 and utilize the wireless e-signoff system 100.

The PED 130 then determines if a task is complete. (Step 225). As discussed above, the task completion component 114 on the vehicle may be a RFID device. Accordingly, the PED 130 may determine that a task is complete when the PED 130 is within the communication range of the respective task completion component 114. When the PED 130 is within the communication range of the respective task completion component 114, the respective task completion component 114 may transmit task data to the PED 130. (Step 230). The task data may include, for example, a unique identification code associated with the respective task completion component 114. The unique identification code may be associated with one or more specific tasks. For example, there may be one task completion component 114 located near the fuel intake valve for the aircraft. A user of a PED 130 bring the PED 130 within range of the task completion component 114 located near the fuel intake valve a first time to first indicate that refueling has begun and then bring the PED 130 within range of the task completion component 114 located near the fuel intake valve a second time to indicate that the refueling has been complete. However, multiple task completion components can be located proximate to the same task system 112 each corresponding to a different task or stage of the respective task.

In one embodiment, for example, a user of the PED 130 may utilize a user interface (not illustrated), such as a camera, a keyboard, a microphone or the like, to provide additional information to the wireless e-signoff management system 120 related to the task. (Step 235). The additional information may be, for example, the code associated with the task completion component 114, a personnel identification code associated with the user who completed the task, a time stamp, a date stamp, textual comments related to the task (e.g., amount of fuel supplied to the aircraft, or the like), pictures of the aircraft or other equipment related to the task, a stage of the task which was just completed, or the like. The additional information can be saved in the memory 124 for later reference, for example, to evaluate personnel performance or for any investigations related to the vehicle 110.

In one embodiment, for example, the received user entered task data may be related to another task. Accordingly, the Step 235 of receiving user entered task data may occur at any time from any PED 130. As an example, a crew member who notices that a certain component is missing from the cabin catering services, such as coffee, can indicate that the component is missing. As another example, a pilot, via a PED 130 issued to the pilot or present in the cockpit, or via a vehicle display 116, can issue specific instructions, such as to not load luggage. Other examples include a pilot request for a certain quantity of fuel to be added to the aircraft, or request placing the cargo in a certain pattern in the cargo hold to enable proper 'weight and balance' of the aircraft. The wireless e-signoff management system 120 upon receipt of the user entered task data can issue new tasks in response to the user entered task data, as discussed in further detail below.

Task data from the task completion components 114 and, if received, user entered task data is then transmitted to the wireless e-signoff management system 120. (Step 240). The processor 122 of the wireless e-signoff management system 120 analyzes the received task and user data and generates an updated task list based thereon. (Step 245). The updated task list reflects the task which has been completed and any new tasks generated based upon the user entered task data.

The updated task list is then transmitted to the coordination system 140 and optionally to any other subscribing device. (Step 250). The coordination system 140 may be a subscribing device by default. However, other devices may optionally subscribe to receive updates. A subscribing device may be, for example, a vehicle display 116 (i.e., either a display fixed on the vehicle 110, a display on a portable electronic device carried onto the vehicle, or a combination thereof), one of the PEDs 130, or the like. A user of the vehicle display 116 may transmit a request to subscribe for turn-around updates to the wireless e-signoff management system 120 at any time during the turn-around process. (Step 255).

In one embodiment, for example, the updated task list may be presented as a dashboard. The dashboard may be presented in a variety of ways including, but not limited to, flowcharts, gauges, tables, or the like. Tasks which are completed may be shown in a different color than tasks which are incomplete. Tasks which are being done slower (against a typical time-taken-to-complete value) on a particular day (or by a particular worker) could be shown differently, so that the personnel can know that they need to speed up. Similarly, tasks which are getting done faster (against a typical time-taken-to-complete value) could be shown differently. These type of indications can be used as self-regulation mechanisms for the workers. The typical time-taken-to-complete value can be dynamically updated based upon the personnel assigned to the task. For example, if a typical turnaround crew for loading baggage consists of three crew members, but only two are available for the target vehicle, the typical time-taken-to-complete value can be adjusted to account for the smaller crew. In this example, the typical time-taken-to-complete value may be increased by fifty percent to account for the smaller baggage crew.

Furthermore, tasks which must be completed before other tasks can begin may also be identified by a different color to aid in identifying which tasks are potentially delaying other tasks from being performed. Other data related to the tasks may also be generated by the wireless e-signoff management system 120 for display on the coordination system 140 and the vehicle display 116. For example, the dashboard may display one or more of a time when a task was started, the personnel assigned to the task, historical average time taken for the task, whether task entered into critical path, task transitioned out of critical path, critical path tasks indicated with flashing mode, time remaining indications, visual clue on parallel and dependable tasks completion, and the like.

When the tasks are complete, a user of the coordination system 140 and/or a pilot/copilot of the vehicle 110 can signoff of the approval for the departure of the aircraft. (Step 260). In one embodiment, for example, the signoff is transmitted from the coordination system 140 to the wireless e-signoff management system 120 which, in turn, transmits the signoff to the vehicle display 116. In other embodiments, for example, the coordination system 140 may directly transmit the signoff to the vehicle display 116. One benefit of the wireless e-signoff system 100 is that by utilizing the task completion components 114 and the PEDs 130 to indicate when tasks are complete the likelihood of a miscommunication from a verbal communication is decreased. Furthermore, overhead announcements used on an aircraft to communicate between the pilot and the flight attendant crew (e.g., boarding doors have been closed and are crosschecked) which are heard by the passengers of the aircraft can be eliminated when the flight attendant crew are issued PED's 130. Furthermore, by providing a bi-directional electronic communication (textual or otherwise) via the PEDs between the ground handlers and the pilot, weight-and-balance issues can be addressed dynamically as the loading is taking place, reducing overall loading time of cargo and baggage.

When all of the tasks are not complete, the wireless e-signoff management system 120 continues to monitor for task completion, transmits requests for new tasks and may analyze task performance, as discussed in further detail below.

In one embodiment, for example, the wireless e-signoff management system 120 may analyze task performance. (Step 265). While the analysis is illustrated as occurring after a task is completed (i.e., Step 225), the analysis may be performed throughout the turnaround of the vehicle. The analysis may include, for example, monitoring the amount of time each task takes, evaluating the performance of the personnel assigned to the PEDs 130, comparing against historical average based on weather, time of the day, skills of personnel involved, task-on-time metrics, or the like. The memory 124 of the wireless e-signoff management system 120 store average times that each task typically takes to complete by all personnel and the average times that each task typically takes to complete by each specific personnel. The processor 122 of the e-signoff management system 120 may compare a time a task was sent relative to the current time to determine how long a current task has been active. The processor 122 may then compare the active task time to the average task time stored in the memory 124 to determine if a task is taking longer than usual. The processor 122 may determine that a task is taking longer than usual when, for example, the active task time exceeds the average task time by a predetermined fixed amount of time, the active task time exceeds the average task time by one or more standard deviations, or the like.

The processor 122 of the wireless e-signoff management system may then generate one or more actions in response to the analysis and/or in response to receiving notice that a task has been completed. (Step 270). The action may include, for example, generating one or more new task assignments. When a previously completed task is a task which must be completed before one or more other tasks can begin, the processor 122 may assign the newly available tasks to personnel in a similar manner as discussed above.

When the personnel assigned to the task are taking longer than usual to complete the task, the processor 122 may take an action corresponding to the currently pending task. The actions may include, for example, sending a request for a status update on the task to the personnel. If additional qualified personnel are available to assist, the processor 122 may assign additional personnel to the task.

The generated actions, including any new tasks, are then distributed by wireless e-signoff management system 120 to one or more PED's 130 associated with the task. (Step 275). The PED's 130 assigned to a task continue to monitor for completed tasks (Step 225), receive task data from task completion components 114 (Step 230), receive user entered task data (Step 235) and transmit the task data to the wireless e-signoff management system 120 (Step 240) in a similar manner as discussed above. Likewise, the wireless e-signoff management system 120 continues to generate updated task lists (Step 245) and distributes task updates to the subscribing devices until the tasks are complete and final signoff has been transmitted. (Step 250).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electronic signoff system for vehicle departure readiness, comprising:
 a wireless e-signoff management system comprising a processor and a memory, the wireless e-signoff management system configured to:
 generate a workflow for a turnaround of the vehicle, the workflow comprising a plurality of tasks that are associated with the departure of the vehicle;
 transmit, via a communication system, one or more of the plurality of tasks to each of a plurality of personal electronic devices corresponding to personnel responsible for completing the one or more of the plurality of tasks;

receive, from at least one of the plurality of personal electronic devices, an indication that one of the plurality of tasks has been completed when the personal electronic device reads a task completion component associated with the one of the plurality of tasks;

update a dashboard corresponding to the workflow after each of the plurality of tasks is completed;

transmit a notification to any subscribing electronic device, the notification including the data from the dashboard;

analyze, for each uncompleted transmitted task, a task performance, the task performance based upon an outstanding task time of each uncompleted transmitted task, and an average time each transmitted task normally takes to complete;

assign additional personnel to the uncompleted transmitted task when the outstanding task time of the uncompleted transmitted task exceeds the average time each transmitted task normally takes to complete by a predetermined amount;

receive, from an electronic device associated with a turnaround coordinator, final signoff notification when the vehicle is ready to depart; and transmit the final signoff notification to the at least one of the subscribing electronic devices.

2. The electronic signoff system of claim 1, wherein each task completion component is proximate to a task system corresponding to one or more of the plurality of tasks.

3. The electronic signoff system of claim 2, wherein each personal electronic device further comprises a near field communication reader and the task completion component is a radio frequency identification tag.

4. The electronic signoff system of claim 2, wherein each task completion component transmits a code associated with a respective task when one of the plurality of personal electronic devices is within communication range of a respective task completion component.

5. The electronic signoff system of claim 1, wherein at least one of the plurality of personal electronic devices is a wearable electronic device.

6. A method for operating an electronic signoff system, comprising:

receiving, by a wireless e-signoff management system, a task list for a turnaround of a vehicle from a coordination system;

generating, by the wireless e-signoff management system, a workflow for the vehicle based upon the received task list, the workflow including an order in which the tasks from the task list may be completed based on available resource;

distributing, by the wireless e-signoff management system, at least one task from the task list to each of a plurality of personnel electronic devices based upon the generated workflow;

receiving, by the wireless e-signoff management system from at least one of the plurality of personal electronic devices, an indication that one of the tasks is a completed task when the at least one of the plurality of personal electronic devices is within communication range of a task completion component, the task completion component being mounted to a task system;

transmitting, by the wireless e-signoff management system, the completed task to the coordination system;

analyze, for each uncompleted transmitted task, a task performance, the task performance based upon an outstanding task time of each uncompleted transmitted task, and an average time each transmitted task normally takes to complete;

assign additional personnel to the uncompleted transmitted task when the outstanding task time of the uncompleted transmitted task exceeds the average time each transmitted task normally takes to complete by a predetermined amount;

receiving, by the wireless e-signoff management system, a final signoff from the coordination system when all of the tasks in the task list are completed tasks; and transmitting, by the wireless e-signoff management system, the final signoff to the vehicle.

7. The method of claim 6, wherein each task completion component is a radio frequency identification tag.

8. The method of claim 6, wherein each task completion component transmits a code associated with a respective task when one of the plurality of personal electronic devices is within communication range of a respective task completion component.

9. The method of claim 6, wherein at least one of the plurality of personal electronic devices is a wearable electronic device.

10. The method of claim 6, further comprising distributing, by the wireless e-signoff management system, at least one task from the task list to one of the plurality of personal electronic devices when a prerequisite task is complete.

11. An electronic signoff system for vehicle departure readiness, comprising:

a plurality of vehicles, each vehicle comprising:
a plurality of task systems associated with tasks; and
a plurality of task completion components, each task completion components mounted on the vehicle proximate to one of the plurality of task systems; and a wireless e-signoff management system comprising a processor and a memory, the wireless e-signoff management system configured to:

generate a workflow for a turnaround of each of the plurality of vehicles based upon available resources and a least one business rule, the workflow comprising a plurality of tasks that are associated with the departure of the plurality of vehicles;

transmit, via a communication system, one or more of the plurality of tasks to each of a plurality of personal electronic devices corresponding to personnel responsible for completing the one or more of the plurality of tasks;

receive, from at least one of the plurality of personal electronic devices, an indication that one of the plurality of tasks has been completed when the personal electronic device reads a corresponding one of the plurality of task completion components associated with the one of the plurality of tasks;

update a dashboard corresponding to the workflow for each of the plurality of vehicles after each of the plurality of tasks corresponding to a respective vehicle is completed;

transmit a notification to any subscribing electronic device, the notification including the data from the dashboard;

analyze, for each uncompleted transmitted task, a task performance, the task performance based upon an outstanding task time of each uncompleted transmitted task, and an average time each transmitted task normally takes to complete;

assign additional personnel to the uncompleted transmitted task when the outstanding task time of the uncompleted transmitted task exceeds the average time each transmitted task normally takes to complete by a predetermined amount;

receive, from an electronic device associated with a turnaround coordinator, final signoff notification when a respective one of the plurality of vehicles is ready to depart; and transmit the final signoff notification for the respective one of the plurality of vehicles to the at least one of the subscribing electronic devices.

12. The electronic signoff system of claim 11, wherein each task completion component is equipped a radio frequency identification tag.

13. The electronic signoff system of claim 11, wherein each task completion component transmits a code associated with a respective task when one of the plurality of personal electronic devices is within communication range of a respective task completion component.

14. The electronic signoff system of claim 11, wherein at least one of the plurality of personal electronic devices is a wearable electronic device.

* * * * *